United States Patent
Sasamori et al.

(10) Patent No.: US 8,792,249 B2
(45) Date of Patent: Jul. 29, 2014

(54) WATERPROOFING STRUCTURE OF MOBILE TERMINAL AND MOBILE TERMINAL INCLUDING THE SAME

(75) Inventors: Keiichi Sasamori, Chiba (JP); Mizuho Ikeda, Kanagawa (JP); Hiroshi Yamamoto, Tokyo (JP); Katsumi Saito, Kanagawa (JP)

(73) Assignees: Sony Corporation, Tokyo (JP); Sony Mobile Communications Inc., Tokyo (JP)

( * ) Notice: Subject to any disclaimer, the term of this patent is extended or adjusted under 35 U.S.C. 154(b) by 229 days.

(21) Appl. No.: 12/950,808

(22) Filed: Nov. 19, 2010

(65) Prior Publication Data

US 2011/0278301 A1 Nov. 17, 2011

Related U.S. Application Data

(60) Provisional application No. 61/334,887, filed on May 14, 2010.

(51) Int. Cl.
*H05K 7/14* (2006.01)
*H05K 7/12* (2006.01)
*H01R 4/00* (2006.01)

(52) U.S. Cl.
USPC ...... 361/801; 361/679.01; 361/730; 174/367; 220/4.02

(58) Field of Classification Search
CPC ... H01M 2/10; H01M 2/1044; H01M 2/1055; H04M 2/1066; H04M 1/18; H04M 11/185; H05K 9/0015; H05K 9/0016
USPC ............ 361/730, 679.01, 801; 174/367, 358, 174/370, 522, 564, 560, 559; 439/197, 259; 220/62.22, 62.11, 379, 3.94, 4.02, 3.8
See application file for complete search history.

(56) References Cited

U.S. PATENT DOCUMENTS

| | | | | |
|---|---|---|---|---|
| 5,621,311 A * | 4/1997 | Kamiya | ........................ | 324/156 |
| 7,306,237 B2 * | 12/2007 | Tsuji et al. | .................... | 277/644 |
| 7,975,870 B2 * | 7/2011 | Laule et al. | ..................... | 220/582 |
| 2004/0121226 A1 * | 6/2004 | Kaelin et al. | ..................... | 429/96 |
| 2005/0180082 A1 * | 8/2005 | Nakamura et al. | ............ | 361/139 |
| 2006/0268528 A1 * | 11/2006 | Zadesky et al. | ............... | 361/728 |
| 2007/0030622 A1 * | 2/2007 | Saida et al. | ..................... | 361/272 |
| 2008/0055258 A1 * | 3/2008 | Sauers | ......................... | 345/173 |
| 2008/0081679 A1 * | 4/2008 | Kawasaki et al. | .......... | 455/575.8 |
| 2010/0206601 A1 * | 8/2010 | Choraku et al. | ............. | 174/50.5 |
| 2010/0258626 A1 * | 10/2010 | Watanabe et al. | ............. | 235/380 |
| 2011/0075381 A1 * | 3/2011 | Chang et al. | .................. | 361/747 |
| 2011/0186578 A1 * | 8/2011 | Kawakami | .................... | 220/378 |
| 2012/0045679 A1 * | 2/2012 | Ishida | ........................... | 429/100 |

FOREIGN PATENT DOCUMENTS

JP 2008-288174 11/2008
JP 2008288174 A * 11/2008

* cited by examiner

*Primary Examiner* — Adrian S Wilson
*Assistant Examiner* — Abhishek Rathod
(74) *Attorney, Agent, or Firm* — Oblon, Spivak, McClelland, Maier & Neustadt, L.L.P.

(57) ABSTRACT

A waterproofing structure for a mobile terminal, includes an annular groove that surrounds an outer edge of a predetermined waterproof area of a mobile terminal. A waterproof lid covers an entire surface of the waterproof area, and includes an annular protrusion that fits into the annular groove in the waterproof area, and an elastic resin portion that covers the annular protrusion. The elastic resin portion press-contacts and adheres to only one of two side wall surfaces of the annular groove when the annular protrusion is fitted into the annular groove.

9 Claims, 7 Drawing Sheets

WATERPROOFING STRUCTURE OF MOBILE TERMINAL AND MOBILE TERMINAL INCLUDING THE SAME

CROSS REFERENCE TO RELATED PATENT APPLICATION

The present application claims the benefit of the earlier filing date of U.S. provisional patent application Ser. No. 61/334,887, filed in the U.S. on May 14, 2010, the entire contents of which being incorporated herein by reference.

BACKGROUND OF THE INVENTION

1. Field of the Invention

The present invention relates to a waterproofing structure for making, for example, a battery space of a mobile terminal waterproof, and to a mobile terminal including the waterproofing structure.

2. Description of the Related Art

Various waterproofing structures have been proposed in order to make, for example, a battery space of a mobile terminal waterproof.

Examples of structures for making a battery space and the like waterproof include the following two waterproofing structures.

One of the two waterproofing structures includes a waterproof packing, which is attached to a battery lid for covering a battery space of a mobile terminal, and a groove that surrounds the battery space. The groove is integrated with a case of the mobile phone, and the battery lid is attached to the mobile terminal so that the battery lid presses the waterproof packing into the groove. That is, with the waterproofing structure, the waterproof packing adheres to the groove, thereby making the battery space waterproof.

The other waterproofing structure includes a lip seal, which is integrated with a battery lid, and a lock mechanism for continuously applying pressure to the lip seal. The lock mechanism is disposed, for example, on a visible surface of the battery lid. With the waterproofing structure, the lock mechanism constantly applies a pressure to the lip seal, thereby making the battery space waterproof.

In addition, Japanese Unexamined Patent Application Publication No. 2008-288174 (FIG. 7) discloses a waterproofing structure in which a battery cover includes an annular protrusion having an elastic member and a mobile phone body has a groove that corresponds to the annular protrusion and into which the elastic member is pressed, whereby the battery space is made waterproof. That is, with the waterproofing structure, the annular protrusion having the elastic member is pressed into the groove of the mobile phone body, thereby making the battery space waterproof.

SUMMARY

However, as recognized by the present inventors, the above-described waterproofing structure in which a waterproof packing is pressed into a groove has a problem in that the waterproof packing is not easily pressed into the groove. That is, the waterproof packing has a width larger than that of the groove to secure a waterproof property, and a certain degree of strong force is necessary to press the wide waterproof packing into the narrow groove. Moreover, air in the groove is compressed when the waterproof packing is pressed into the groove, and the compressed air attempts to push the waterproof packing back out of the groove, so that the waterproof packing is not easily pressed into the groove.

Furthermore, after the waterproof packing has been pressed into the groove, the compressed air continuously applies a force to the waterproof packing and attempts to push the waterproof packing back out of the groove. Therefore, it is necessary that the waterproofing structure additionally include a detachment-prevention lock mechanism for preventing the waterproof packing from coming off, i.e., for preventing the battery lid from coming off. The cost of the mobile terminal increases when the detachment-prevention lock mechanism is added. Moreover, the detachment-prevention lock mechanism is disposed, for example, on a visible surface of the case. Disposing the detachment-prevention lock mechanism on the visible surface of the case or the like is not desirable in terms of the design of the mobile terminal.

The technology described in Japanese Unexamined Patent Application Publication No. 2008-288174 has a similar problem in that, when the elastic member of the annular protrusion formed on the battery cover is pressed into the groove in the mobile phone body, the air in the groove is compressed, so that the annular protrusion is not easily fitted into the groove.

In the above waterproofing structure using a lip seal, it is necessary to continuously apply a pressure to the lip seal in order to maintain the waterproof property. Therefore, it is necessary to provide the waterproofing structure with a strong lock mechanism for continuously applying a pressure to the lip seal, and it is necessary that the battery lid has a high rigidity because the pressure is applied to the entire surface of the battery lid. The cost and the weight of the mobile terminal may increase when such a strong lock mechanism is provided and a battery lid having a high rigidity is used. Moreover, disposing the lock mechanism, for example, on a visible surface of the case is not desirable in terms of the design of the mobile terminal.

It is desirable to provide a waterproofing structure of a mobile terminal with which a waterproof lid can be easily mounted on the mobile terminal and that can realize a high waterproof property without using an additional lock mechanism or the like, and to provide a mobile terminal including the waterproofing structure.

According to an embodiment of the present invention, there is provided a waterproofing structure of a mobile terminal, the waterproofing structure including an annular groove that surrounds an outer edge of an open portion of a cavity of the mobile terminal, the annular groove having two side wall surfaces; and a waterproof lid that covers an entirety of the open portion of the cavity and seals the cavity to form a waterproof cavity,
wherein the waterproof lid being removable and includes
an annular protrusion that fits into the annular groove, and
an elastic resin portion that covers the annular protrusion,
the elastic resin portion being in press-contact with only one of the two side wall surfaces of the annular groove when the annular protrusion and elastic resin portion are disposed in the annular groove According to an embodiment of the present invention, there is provided a mobile terminal including a case;
an annular groove that surrounds an outer edge of an open portion of a cavity of the case, the annular groove having two side wall surfaces; and
a waterproof lid that covers an entirety of the open portion of the cavity and seals the cavity to form a waterproof cavity,
wherein the waterproof lid being removable and includes
an annular protrusion that fits into the annular groove, and
an elastic resin portion that covers the annular protrusion,
the elastic resin portion being in press-contact with only one of the two side wall surfaces of the annular groove when the annular protrusion and elastic resin portion are disposed in the annular groove.

That is, according to embodiments of the present invention, when the annular protrusion is fitted into the annular groove, the elastic resin portion press-contacts and adheres to one of the side wall surfaces of the annular groove, thereby making the mobile terminal waterproof. According to embodiments of the present invention, when the annular protrusion is fitted into the annular groove, the elastic resin portion contacts and adheres only one of the two side wall surfaces of the annular groove, thereby allowing air in the annular groove to be discharged along the other of the two side wall surfaces.

The waterproofing structure of a mobile terminal and the mobile terminal according to embodiments of the present invention may further include an outer lid attached to the mobile phone terminal so that the outer lid covers an entire surface of the waterproof lid when the annular protrusion is fitted into the annular groove, the outer lid applying a load to a surface of the waterproof lid that faces the outer lid so as to warp the waterproof lid in such a direction that the elastic resin portion is pressed against the outer side wall of the annular groove.

That is, according to embodiments of the present invention, the outer lid covers the waterproof lid and press-contacts the waterproof lid in such a direction that the elastic resin portion is pressed against the side wall surface of the annular groove, thereby making the elastic resin portion more strongly adhere to the side wall surface.

According to the embodiments of the present invention, when the annular protrusion is fitted into the annular groove, the elastic resin portion contacts and adheres to one of the side wall surfaces of the annular groove, thereby realizing a high waterproof property.

According to the embodiments of the present invention, the elastic resin portion contacts only one of the two side wall surfaces of the annular groove, so that air in the annular groove can be discharged along the other of the side wall surfaces, whereby the annular protrusion of the waterproof lid can be more easily fitted into the annular groove.

According to the embodiments of the present invention, the outer lid is attached to the mobile terminal so that the outer lid covers the waterproof lid. Therefore, a lock mechanism for fixing the waterproof lid is not necessary.

DESCRIPTION OF THE EMBODIMENTS

Hereinafter, an embodiment the present invention will be described with reference to the drawings.

The embodiment is a waterproofing structure that makes a battery space of a mobile phone terminal waterproof. The embodiment is an example, and the present invention is not limited thereto.

Outline of Waterproof Structure of Mobile Phone Terminal of the Embodiment

Figure 1:
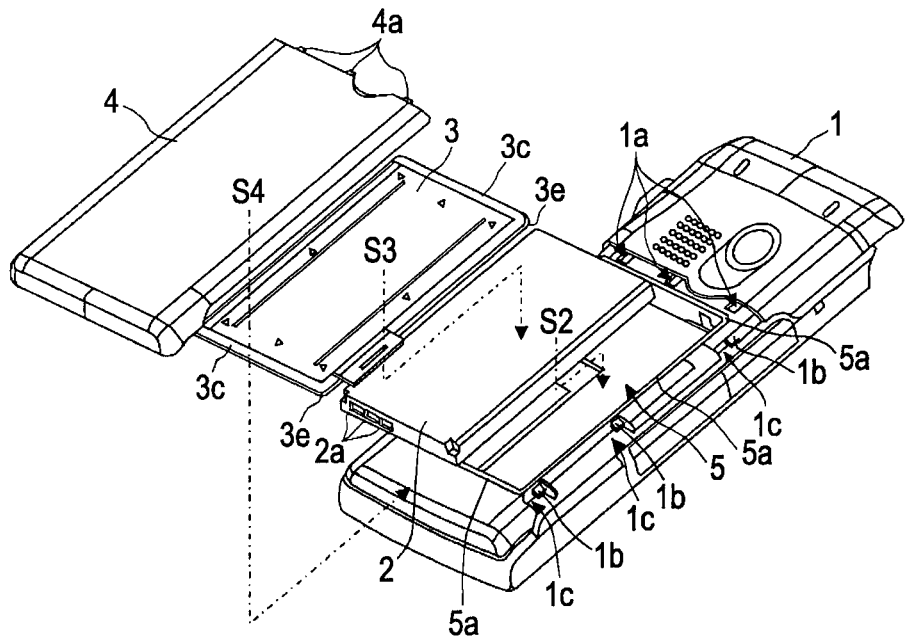
FIG. 1 is an exploded perspective view of a mobile phone terminal including a waterproofing structure according to an embodiment of the present invention.

FIG. 1 is an exploded perspective view of a terminal body 1, which is a main part of a mobile phone terminal according to the embodiment of the present invention, a battery 2, an inner battery lid 3, and an outer battery lid 4.

As illustrated in FIG. 1, in the mobile phone terminal of the embodiment, the battery 2 is attached to the terminal body 1 in the following manner: the battery 2 is fitted into a battery space 5 of the terminal body 1 as indicated by an arrow S2; the inner battery lid 3 is fitted into the battery space 5 so that the inner battery lid 3 covers the battery space 5 as indicated by an arrow S3; and the outer battery lid 4 is slid and fitted into the terminal body 1 from above the inner battery lid 3 as indicated by an arrow S4.

Figure 2:
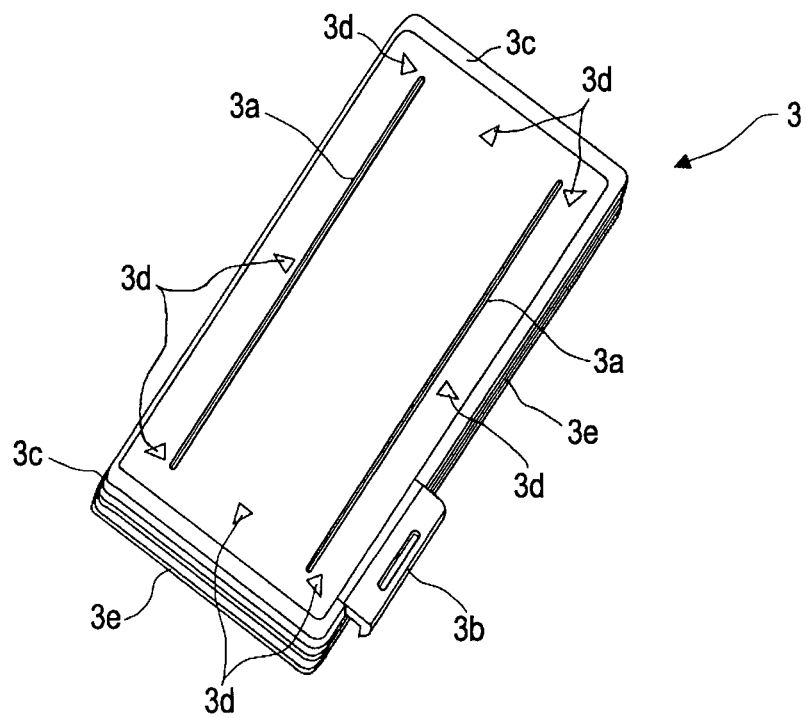
FIG. 2 is an enlarged view of an inner battery lid.
Figure 3:
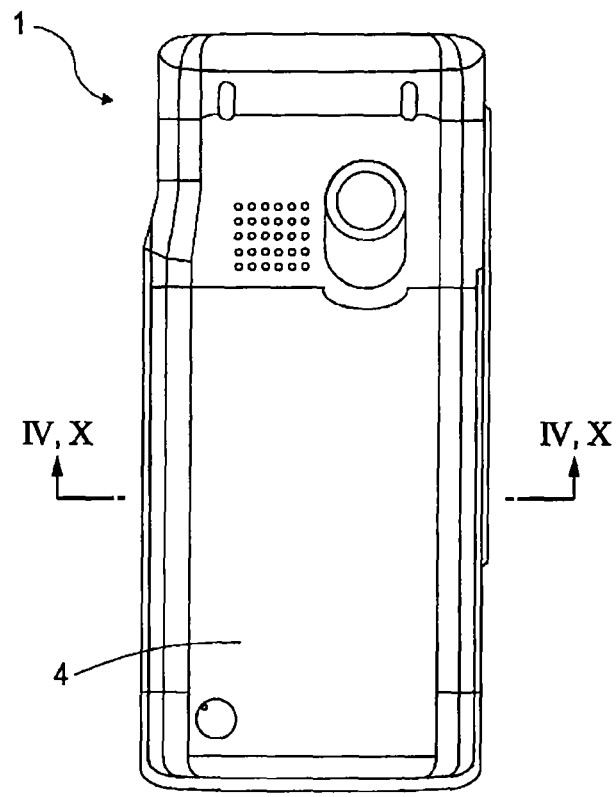
FIG. 3 is an external view of the mobile phone terminal viewed from the outer battery lid side.
Figure 4:
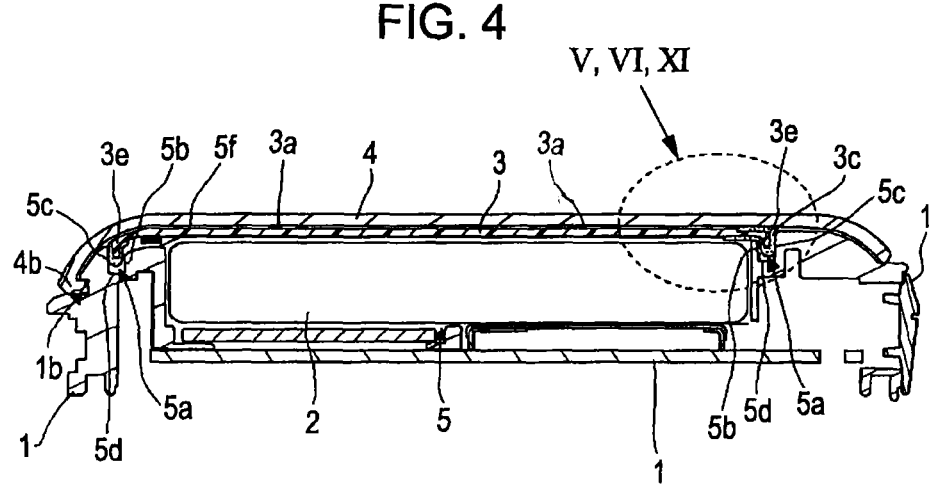
FIG. 4 is a schematic sectional view of the mobile phone terminal taken along line IV,X-IV,X of FIG. 3.
Figure 5:
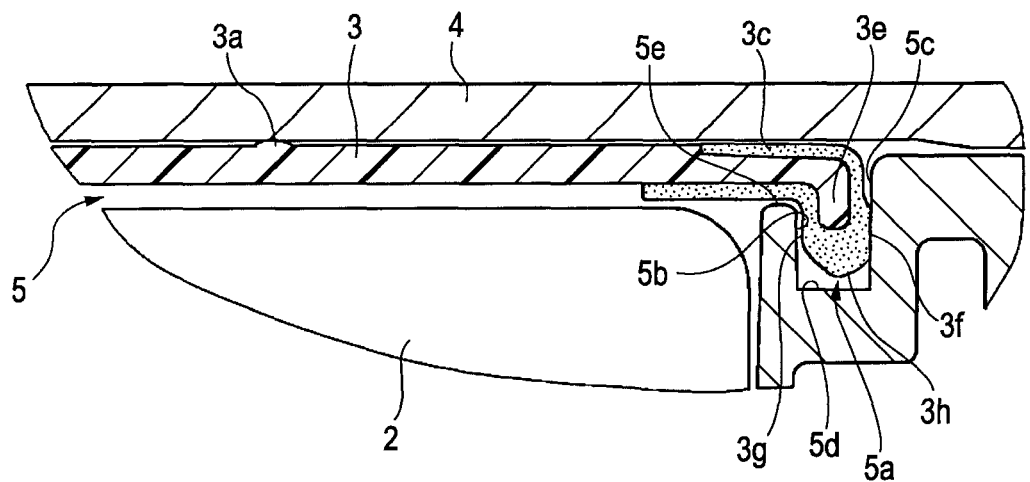
FIG. 5 is an enlarged sectional view illustrating a region surrounded by a dotted line V,VI,XI in FIG. 4.
Figure 6:
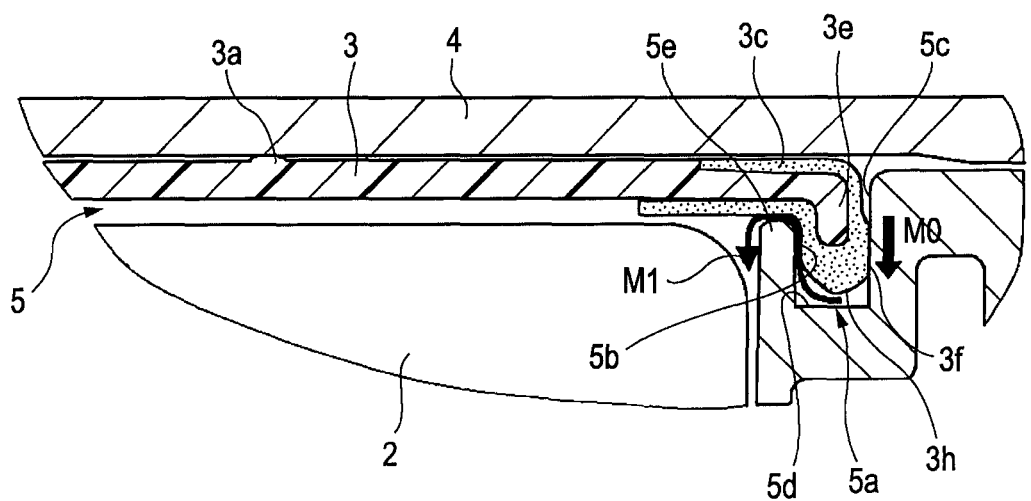
FIG. 6 is an enlarged sectional view of a region surrounded by the dotted line V,VI,XI in FIG. 4, illustrating an airflow from the an annular groove.

FIG. 2 is an enlarged view of the inner battery lid 3. FIG. 3 illustrates the mobile phone terminal of the embodiment when the battery 2, the inner battery lid 3, and the outer battery lid 4 are attached to the terminal body 1, viewed from the outer battery lid 4 side. FIG. 4 is a schematic sectional view of the mobile phone terminal taken along line IV,X-IV,X of FIG. 3. FIGS. 5 and 6 are enlarged views illustrating a region surrounded by a dotted line V,VI,XI in FIG. 4.

As illustrated in FIG. 1, the battery 2 has, for example, a rectangular plate-like shape, and has battery contacts 2a, for example, on a side surface on one of the short sides of the rectangle. Through the battery contacts 2a, the battery 2 can be electrically connected to terminal contacts disposed on the terminal body 1. The battery 2 is fitted into the battery space 5 as indicated by the arrow S2 in FIG. 1. When the battery 2 is correctly installed in the battery space 5, the battery contacts 2a are electrically connected to the terminal contacts of the terminal body 1, whereby electric power is supplied to the terminal body 1 through the battery contacts 2a and the terminal contacts.

The battery space 5 of the terminal body 1 has an opening and an installation space for containing the battery 2, which has the rectangular plate-like shape, therein. The opening and the installation space of the battery space 5 correspond to a waterproof area, and the waterproofing structure of the embodiment is provided so as to make the waterproof area waterproof. The battery space 5 has the terminal contacts, which are electrically connected to the battery contacts 2a of the battery 2. In the embodiment, the battery space 5 has an annular groove 5a that surrounds the outer edge of the opening of the waterproof area. As illustrated in FIGS. 4 to 6, the annular groove 5a is defined by an outer side wall surface 5c, an inner side wall surface 5b, and a bottom surface 5d.

The inner battery lid 3 corresponds to a waterproof lid in the present invention. As illustrated in FIG. 2, the inner battery lid 3 has a rectangular plate-like shape, and includes an annular protrusion 3e that surrounds the outer edge portion of the rectangle and protrudes in a direction substantially perpendicular to a flat portion. That is, in the embodiment, the annular protrusion 3e of the inner battery lid 3 has an annular shape that corresponds to the annular groove 5a formed in the outer edge of the opening of the battery space 5 and that allows the annular protrusion 3e to be fitted into the annular groove 5a. The annular protrusion 3e of the inner battery lid 3 is covered with a synthetic resin, such as a silicone rubber, that has a certain degree of elasticity, that is deformable, and that has a high adhesion property in an area in which the synthetic resin is in contact with another member. In the embodiment, the inner battery lid 3 is made, for example, by molding a plastic into the rectangular plate-like shape having an annular protrusion in the outer edge portion, and by insert-molding a silicone rubber 3c so that the silicon rubber 3c covers the annular protrusion 3e. In the embodiment, the battery lid 3 has two flat portions. One of the two flat portions, from which the annular protrusion 3e protrudes, is located on the terminal body 1 side (on the battery 2 side) when the inner battery lid 3 is attached to the terminal body 1. Hereinafter, this flat portion will be referred to as an inner flat portion.

In the embodiment, when attaching the inner battery lid 3 to the terminal body 1, the annular protrusion 3e, which is covered with the silicone rubber 3c, is fitted into the annular groove 5a of the battery space 5.

Waterproof Structure and Movement of Air in Annular Groove during Attachment of Inner Battery Lid In the embodiment, the annular protrusion 3e of the inner battery lid 3 and the annular groove 5a of the battery space 5 are designed to have shapes such that, as illustrated in FIGS. 4 to 6, when the annular protrusion 3e is fitted into the annular groove 5a of the battery space 5, an outer silicone rubber portion 3f of the annular protrusion 3e is pressed against the outer side wall surface 5c of the annular groove 5a and there is a small gap between an inner silicone rubber portion 3g of the annular protrusion 3e and the inner side wall surface 5b of the annular groove 5a. As described above, the silicone rubber 3c has a certain degree of elasticity, is deformable, and has a high adhesion property in an area in which the silicone rubber 3c is in contact with another member.

That is, in the embodiment, when the annular protrusion 3e of the inner battery lid 3 is fitted into the annular groove 5a of the battery space 5, the outer side wall surface 5c of the annular groove 5a and the outer silicone rubber portion 3f of the annular protrusion 3e are press-contacted against each other and adhere to each other. Therefore, with the embodiment, water is prevented from entering an area at which the annular protrusion 3e of the inner battery lid 3 is fitted into the annular groove 5a of the battery space 5, whereby the waterproof area is provided with a high waterproof property.

In the embodiment, when the annular protrusion 3e of the inner battery lid 3 is fitted into the annular groove 5a of the battery space 5, the silicone rubber 3c of the annular protrusion 3e adheres to only the outer side wall surface 5c of the annular groove 5a and there are gaps between the silicone rubber 3c and the inner side wall surface 5b of the annular groove 5a and between the silicone rubber 3c and the bottom surface 5d of the annular groove 5a. Therefore, as illustrated in FIG. 6, when the annular protrusion 3e of the inner battery lid 3 is fitted into the annular groove 5a of the battery space 5 in the direction indicated by an arrow M0, the air in the annular groove 5a passes through the gaps along an arrow M1 toward the inside of the terminal body 1. That is, with the embodiment, when the annular protrusion 3e of the inner battery lid 3 is fitted into the annular groove 5a of the battery space 5, the air in the annular groove 5a is not compressed in the groove. Moreover, with the embodiment, when the annular protrusion 3e of the inner battery lid 3 is fitted into the annular groove 5a of the battery space 5, the silicone rubber 3c of the annular protrusion 3e adheres to only the outer side wall surface 5c of the annular groove 5a, so that the degree of deformation of the silicone rubber 3c is reduced as compared with, for example, existing waterproofing structures, whereby the annular protrusion 3e can be easily fitted into the annular groove 5a. Therefore, with the embodiment, it is not necessary for a user to strongly press the inner battery lid 3 when attaching the inner battery lid 3 to the terminal body 1.

Figure 7:
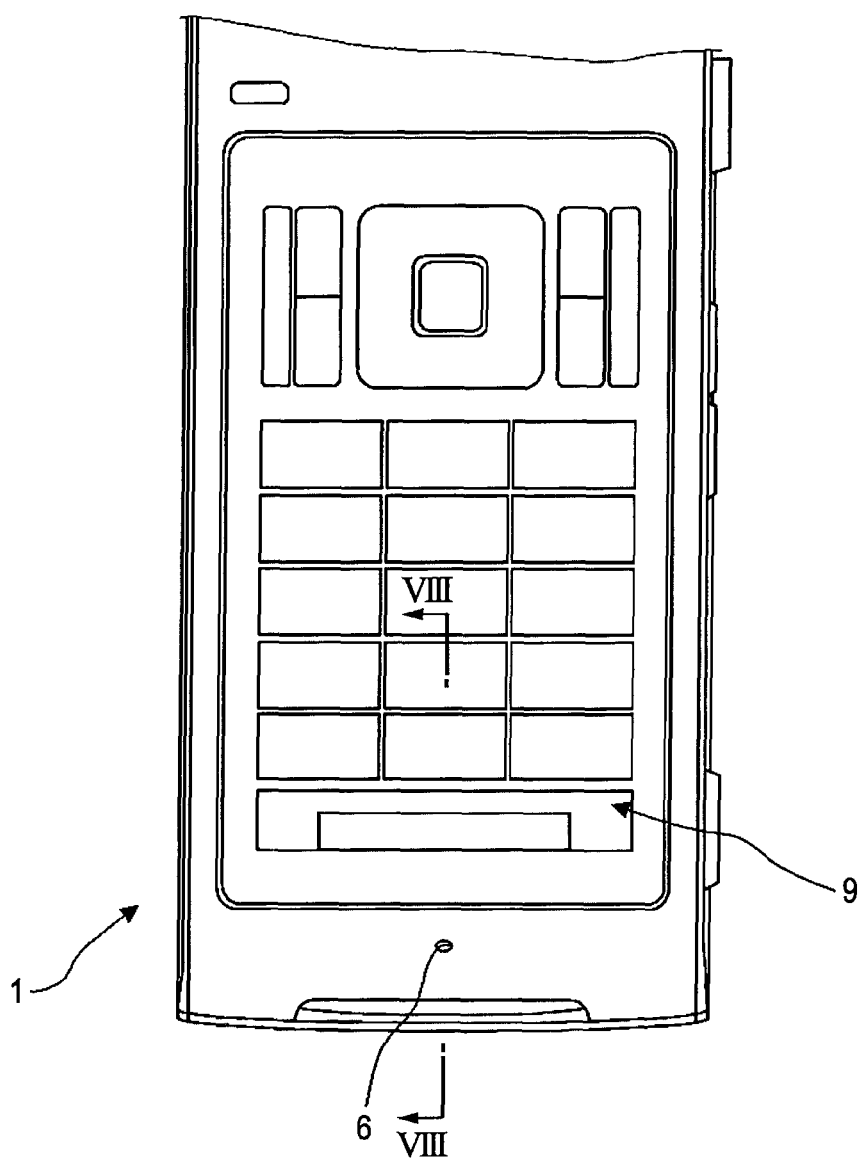
FIG. 7 is an enlarged view of the mobile phone terminal, illustrating a region including operation keys.
Figure 8:
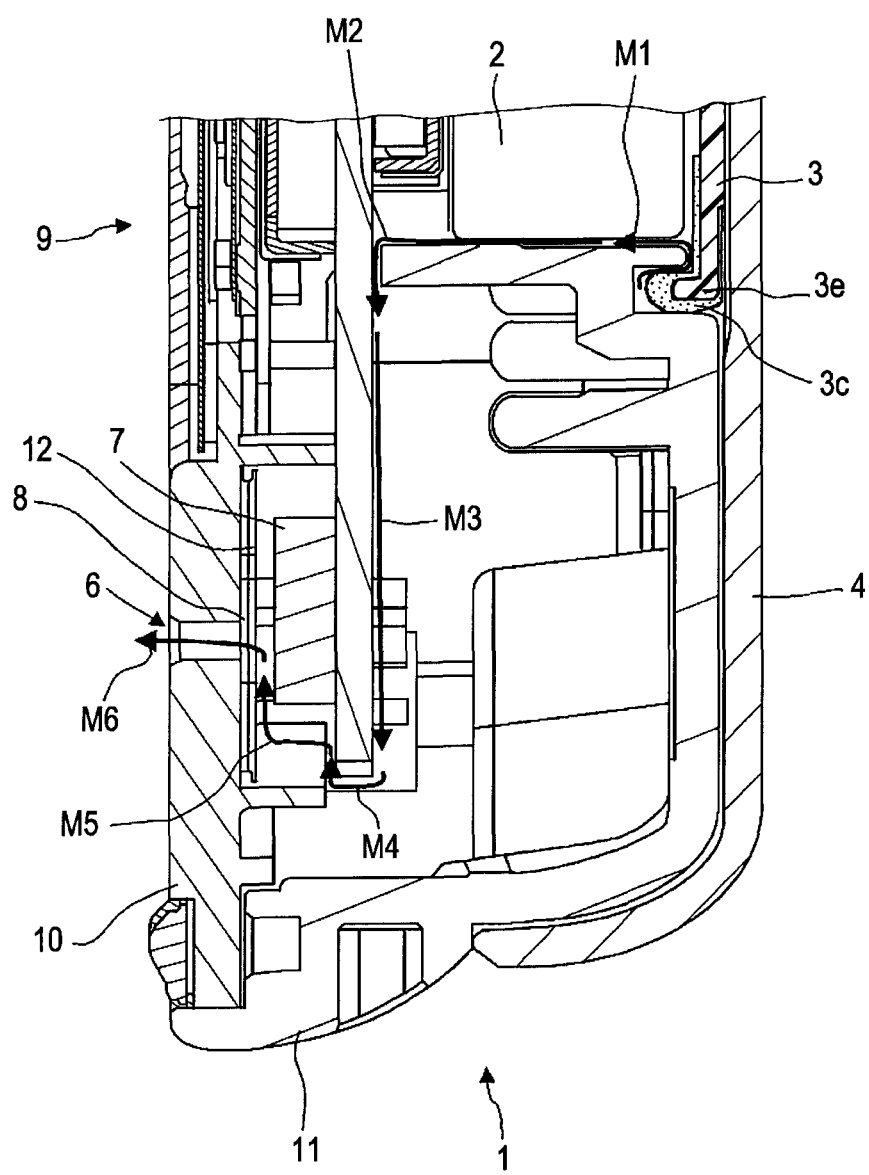
FIG. 8 is a schematic sectional view of the mobile phone terminal taken along line VIII-VIII of FIG. 7.
Figure 9:
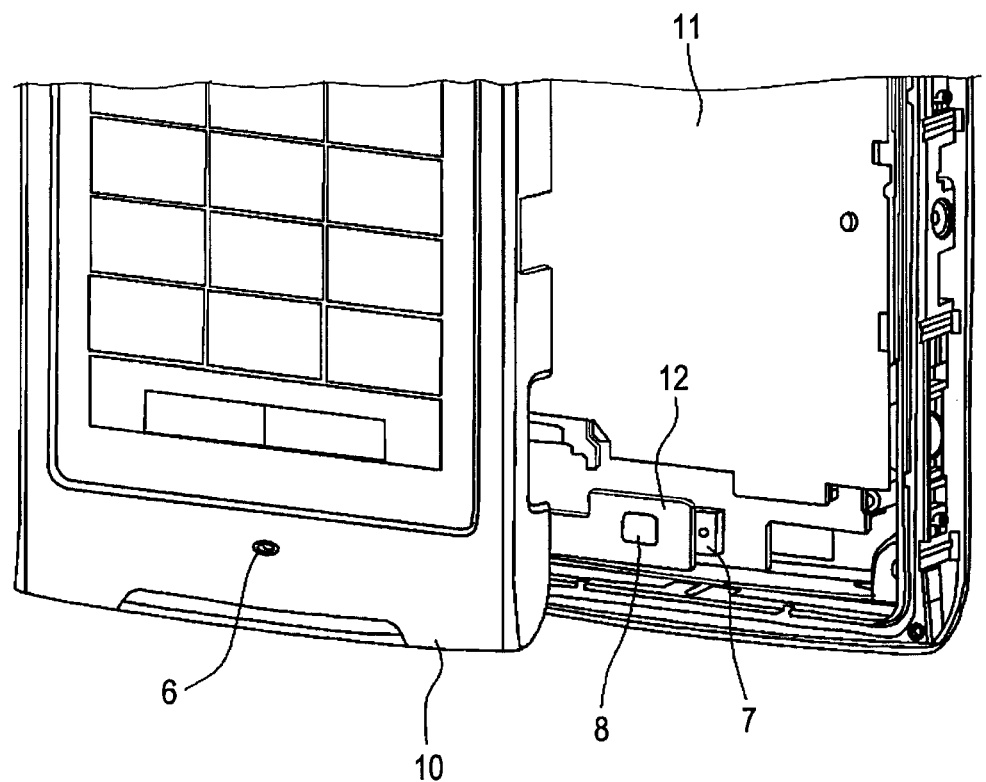
FIG. 9 is an exploded perspective view of the mobile phone terminal according to the embodiment, illustrating parts of a front case and a rear case near to the operation keys.

In the embodiment, when the annular protrusion 3e of the inner battery lid 3 is inserted into the annular groove 5a of the battery space 5, the air that has moved from the annular groove 5a into the inside of the terminal body 1 is discharged to the outside, for example, through a waterproof mesh disposed in a microphone opening 6 as illustrated in FIGS. 7 to 9.

FIG. 7 is an enlarged view of a region including operation keys 9 of the mobile phone terminal according to the embodiment. FIG. 8 is a schematic sectional view of the mobile phone terminal taken along line VIII-VIII of FIG. 7. FIG. 9 is an exploded perspective view of the mobile phone terminal, illustrating parts of a front case 10 and a rear case 11 near to the operation keys 9.

As illustrated in FIGS. 7 to 9, when the annular protrusion 3e of the inner battery lid 3 is inserted into the annular groove 5a of the battery space 5, the air that has moved from the annular groove 5a to the inside of the terminal body 1 as illustrated in FIG. 6 moves in the inner space of the terminal body 1 as indicated by an arrow M1 in FIG. 6 and arrows M2, M3, M4, M5, and M6 in FIG. 8, passes through a waterproof mesh 8 disposed between the microphone opening 6 and a microphone 7, and discharged to the outside. In the embodiment, the waterproof mesh 8 is made of a waterproof film that blocks water and water vapor, but allows air to pass therethrough. Example materials that are impervious to liquid, but permeable to gases include, but are not limited to, microporous materials including polyurethane, polytetrafluoroethylene, thermoplastics etc. The waterproof mesh 8 is attached to an inner wall of the front case 10 using a waterproof adhesive tape 12.

In the embodiment, when the annular protrusion 3e of the inner battery lid 3 has been completely fitted into the annular groove 5a of the battery space 5, an inner wall end portion 5e of the annular groove 5a and an inner flat portion of the inner battery lid 3 contact each other, and the bottom surface 5d of the annular groove 5a and a protrusion end portion 3h of the silicone rubber 3c contact each other. Thus, the depth (the position in Z direction) to which the inner battery lid 3 is fitted into the terminal body 1 is determined.

Attachment of Outer Battery Lid

As illustrated in FIG. 1, the outer battery lid 4 is one of the components that constitute the visible surface of the mobile phone terminal of the embodiment. The outer battery lid 4 corresponds to an outer lid in the present invention. When the outer battery lid 4 is attached to the terminal body 1, the outer battery lid 4 completely covers the inner battery lid 3 and the like, whereby the inner battery lid 3 and the like are prevented from being seen from the outside.

As illustrated in FIGS. 1, 4, and other figures, in the terminal body 1 of the embodiment, three claw engagement portions 1b are disposed near to an outer edge portion on each of the two long sides of the battery space 5. (There are six claw engagement portions 1b in total.) A claw receiving portion 1c is disposed adjacent to each of the six claw engagement portions 1b. (There are six claw receiving portions 1c in total.) Moreover, three claw engagement portions 1a are disposed on a short side of the outer edge portion of the battery space 5 near to the center of the terminal body.

In the embodiment, as illustrated in the figures including FIGS. 1 and 4, the outer battery lid 4 has three claws 4a that are respectively fitted into the three claw engagement portions 1a of the terminal body 1 and six claws 4b that are respectively fitted into the six claw engagement portions 1b of the terminal body 1, so that the outer battery lid 4 can be fixed to the terminal body 1. That is, the outer battery lid 4 has the six claws 4b that are respectively fitted into the six claw engagement portions 1b and three claws 4a that are respectively fitted into the three claw engagement portions 1a when the outer battery lid 4 is attached to the terminal body 1.

In the embodiment, when attaching the outer battery lid 4 to the terminal body 1, each of the claws 4b of the outer battery lid 4 is inserted into corresponding one of the claw receiving portions 1c of the terminal body 1, the outer battery lid 4 is slid as indicated by an arrow 4S in FIG. 1, and each of the claws 4b is fitted into corresponding one of the claw engagement portions 1b. When the outer battery lid 4 has been slid as described above and each of the claws 4b has been fitted into corresponding one of the claw engagement portions 1b, each of the three claws 4a of the outer battery lid 4 is fitted into corresponding one of the three claw engagement portions 1a of the terminal body 1. Thus, the outer battery lid 4 is substantially fixed to the terminal body 1.

Relationship between Outer Battery Lid and Inner Battery Lid

As illustrated in FIG. 2, in the embodiment, the inner battery lid 3 has, for example, two linear protrusions 3a on an outer flat portion thereof. The outer flat portion is opposite to the inner flat portion and faces the outer battery lid 4 when the outer battery lid 4 is attached to the terminal body 1.

The linear protrusions 3a extend in a direction that is the same as the direction in which the outer battery lid 4 is slidingly fitted into the terminal body 1 so as to cover the inner battery lid 3 after the inner battery lid 3 has been attached to the terminal body 1.

In the embodiment, the height by which the linear protrusions 3a protrude from the outer flat portion is determined so that the inner flat portion of the outer battery lid 4 is pressed against the linear protrusions 3a of the inner battery lid 3 when the outer battery lid 4 is attached to the terminal body 1.

Moreover, the mobile phone terminal of the embodiment is designed so that there is a certain gap between the inner flat portion of the inner battery lid 3 and an outer flat portion of the battery 2 when the inner battery lid 3 is attached to the terminal body 1.

Figure 10:
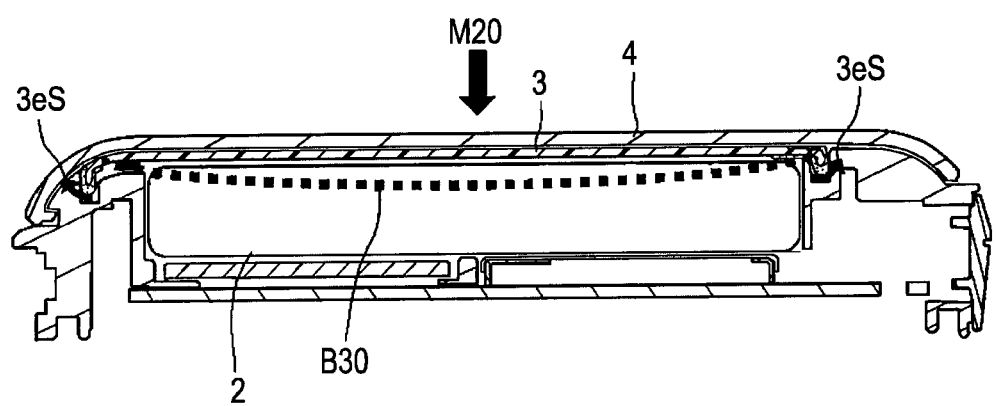
FIG. 10 is a schematic sectional view of the mobile phone terminal taken along line IV,X-IV,X of FIG. 3, illustrating a state in which the inner battery lid is warped.
Figure 11:
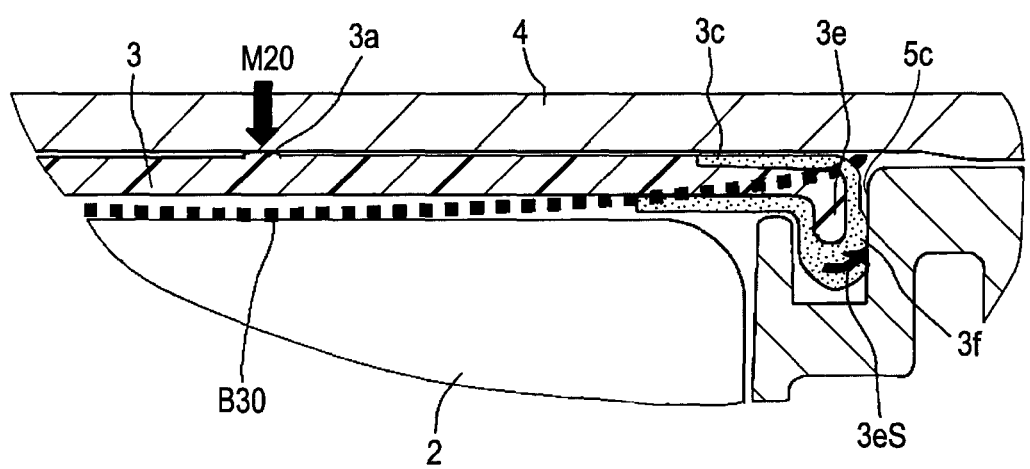
FIG. 11 is an enlarged sectional view of a region surrounded by the dotted line V,VI,XI in FIG. 4, illustrating the state in which the inner battery lid is warped.

Therefore, as illustrated in FIGS. 10 and 11, in the mobile phone terminal of the embodiment, when the outer battery lid 4 is attached to the terminal body 1, the inner flat portion of the outer battery lid 4 applies a load (pressing force) to the linear protrusions 3a of the inner battery lid 3 in a direction indicated by an arrow M20, so that the inner battery lid 3 is pressed toward the battery space 5 and becomes warped as illustrated with a dotted line B30. Moreover, when the inner battery lid 3 becomes warped toward the battery space 5 as illustrated with the dotted line B30, the annular protrusion 3e becomes warped toward the outer side wall surface 5c of the annular groove 5a as indicated by an arrow 3eS in FIGS. 10 and 11. That is, when the annular protrusion 3e becomes warped in the direction indicated by the arrow 3eS in FIGS. 10 and 11, the outer silicone rubber portion 3f of the annular protrusion 3e is strongly pressed against the outer side wall surface 5c of the annular groove 5a. In other words, in the embodiment, the linear protrusions 3a and the gap between the inner battery lid 3 and the battery 2 are provided so as to more strongly press the outer silicone rubber portion 3f of the annular protrusion 3e against the outer side wall surface 5c of the annular groove 5a and make the outer silicone rubber portion 3f adhere to the outer side wall surface 5c.

It is preferable that the outer battery lid 4 have a higher rigidity than the inner battery lid 3 in order to warp (deform) the inner battery lid 3. The rigidity of the outer battery lid 4 can be increased by using a material having a higher hardness than the inner battery lid 3 or by making the thickness of the outer battery lid 4 larger than that of the inner battery lid 3.

Thus, in the mobile phone terminal of the embodiment, the outer silicone rubber portion 3f of the annular protrusion 3e strongly adheres to the outer side wall surface 5c of the annular groove 5a, so that the waterproof area is provided with a higher waterproof property and hermeticity.

In the embodiment, the outer battery lid 4 is attached to the terminal body 1 so that the outer battery lid 4 covers the inner battery lid 3, whereby it is not necessary to additionally provide a detachment-prevention lock mechanism or the like for preventing coming off of the inner battery lid 3.

Description of other Configurations

As illustrated in FIG. 2, in the embodiment, eight press marks 3d are formed on the outer flat portion of the inner battery lid 3. When a user attaches the inner battery lid 3 to the terminal body 1, the press marks 3d indicate to the user the positions to be pressed with his/her finger so that the annular protrusion 3e can be completely fitted into the annular groove 5a.

In the embodiment, the inner battery lid 3 has a holding portion 3b, which a user can hold with his/her finger or the like, at a predetermined position in the outer edge portion. A user can hold the holding portion 3b with his/her finger or the like when removing the inner battery lid 3 from the terminal body 1. In the embodiment, the predetermined position at which the holding portion 3b is disposed is, for example, in the outer edge portion on a long side of the rectangle. In the embodiment, in order to allow a user to remove the inner battery lid 3 by holding the holding portion 3b with his/her finger or the like, an inner wall end portion 5f of the annular groove 5a of the battery space 5, which faces the inner wall end portion 5e near to the holding portion 3b, has a height smaller than that of the inner wall end portion 5e. That is, in the mobile phone terminal of the embodiment, the inner wall end portion 5f, which faces the inner wall end portion 5e near to the holding portion 3b, has a smaller height, so that the inner flat portion of the inner battery lid 3 is prevented from contacting the inner wall end portion when a user holds and lifts the holding portion 3b with his/her finger or the like, whereby the user can easily remove the inner battery lid 3.

The mobile phone terminal of the embodiment further includes a connection strip portion that connects the inner battery lid 3 to the terminal body 1. The connection strip portion is disposed, for example, near to the center of the outer edge portion on a long side that faces the outer edge portion on the long side on which the holding portion 3b is disposed. The connection strip portion has a length and a flexibility that prevent the inner battery lid 3 from being completely removed from the terminal body 1 and allows the inner battery lid 3 to be separated by a certain distance from the terminal body 1 when the inner battery lid 3 is removed from the terminal body 1.

SUMMARY

As described above, in the waterproofing structure according to the embodiment of the present invention, when the inner battery lid 3 is attached to the terminal body 1, the outer silicone rubber portion 3f of the annular protrusion 3e of the inner battery lid 3 contacts only the outer side wall surface 5c of the annular groove 5a of the battery space 5 and there is a gap between the inner silicone rubber portion 3g and the inner side wall surface 5b, whereby the air in the annular groove 5a can be discharged and the degree of deformation of the silicone rubber 3c is reduced, so that the inner battery lid 3 can be easily inserted.

Moreover, in the waterproofing structure of the embodiment, there is a gap between the inner battery lid 3 and the battery 2, and the outer battery lid 4 warps the inner battery lid 3, whereby the outer silicone rubber portion 3f is more strongly pressed against and made to adhere to the outer side wall surface 5c, so that a high waterproof property and hermeticity are realized.

The above embodiment is an example of the present invention. Therefore, the present invention is not limited to the embodiment described above, and can be modified in various ways in accordance with the design and the like within the spirit and the technical scope of the present invention.

For example, the embodiment has the two linear protrusions 3a. However, the number of the linear protrusions may be, for example, three, four, or larger. The linear protrusions 3a, which are disposed near to the outer edge portion of the outer flat surface of the inner battery lid 3 in the example illustrated in FIG. 2, may be disposed at substantially the center of the outer flat surface of the inner battery lid 3. The length of the linear protrusions 3a is not limited to the example illustrated in FIG. 2, and may be smaller than that of FIG. 2. However, as with the example of FIG. 2, it is preferable that the linear protrusions extend from positions near to one outer edge portion to positions near to the other outer edge portion. The shape of the protrusions may not be linear and, for example, may be dome-like, quadrangular, triangular, or the like. Also in such cases, the height of the protrusions is, as described above, a height that allows the inner flat surface of the outer battery lid 4 to press the inner battery lid 3 toward the battery space 5 and warp the inner battery lid 3, i.e., a height that allows the inner flat surface of the outer battery lid 4 to warp the inner battery lid 3 so as to strongly press the outer silicone rubber portion 3f against the outer side wall surface 5c of the annular groove 5a and make the outer silicone rubber portion 3f adhere to the outer side wall surface 5c.

In the embodiment described above, the protrusions for warping the inner battery lid 3 are disposed on the outer flat portion of the inner battery lid 3. However, the protrusions may be disposed on the inner flat portion of the outer battery lid 4, as shown in FIG. 4.

In the present invention embodiment, for example, only the inner silicone rubber portion 3g of the annular protrusion 3e may contact the inner side wall surface 5b of the annular groove 5a and there may be a gap between the outer silicone rubber portion 3f of the annular protrusion 3e and the outer side wall surface 5c of the annular groove 5a, so that the waterproof property and the ease of insertion can be improved. However, in this case, in order to warp the inner battery lid 3 so as to improve the waterproof property, it is necessary to form, for example, linear, dome-like, quadrangular, or triangular protrusions on the inner flat portion of the inner battery lid or on the outer flat portion of the battery 2 and to provide a gap between the outer flat portion of the inner battery lid 3 and the inner flat portion of the outer battery lid 4.

The embodiment described above is an example of a waterproofing structure for making the battery space of a mobile phone terminal waterproof. However, the present invention can be applied, for example, to various waterproofing structures including waterproofing structure of terminal portions.

It should be understood by those skilled in the art that various modifications, combinations, sub-combinations and alterations may occur depending on design requirements and other factors insofar as they are within the scope of the appended claims or the equivalents thereof.

What is claimed is:

1. A waterproofing structure of a mobile terminal, the waterproofing structure comprising:
    an annular groove that surrounds an outer edge of an open portion of a cavity of the mobile terminal, said annular groove forming a gap between two side wall surfaces of the groove, each of the two side wall surfaces provided immediately adjacent the gap; and
    a waterproof lid that covers an entirety of the open portion of the cavity and seals the cavity to form a waterproof cavity,
    wherein the waterproof lid is removable and includes:
        a main body portion,
        an inner flat portion extending substantially along a same plane as the main body portion,
        an annular protrusion extending substantially perpendicular to the inner flat portion and extending into the gap formed by the annular groove and in between the two side wall surfaces, and
        an elastic resin portion that covers an entirety of an outer surface of the annular protrusion and the inner flat portion, the elastic resin portion configured to be in press-contact with only one of the two side wall surfaces of the annular groove when the annular protrusion and elastic resin portion are disposed in the annular groove,
    wherein the two side wall surfaces of the annular groove include an inner side wall surface and an outer side wall surface, and the elastic resin portion being positioned to press-contact and adhere to the outer side wall surface and being separated from the inner side wall surface by a predetermined gap.

2. The waterproofing structure of a mobile terminal according to claim 1, further comprising:
    an outer lid attached to the mobile terminal and formed to cover an entire surface of the waterproof lid when the annular protrusion and elastic resin portion are fitted into the annular groove, the outer lid applying a load to a surface of the waterproof lid that faces the outer lid so as to warp the waterproof lid in such a direction that the elastic resin portion is pressed against the outer side wall surface of the annular groove.

3. The waterproofing structure of a mobile terminal according to claim 2,
    wherein the waterproof lid includes a protrusion that transfers a biasing force applied by the outer lid to the surface of the waterproof lid, said protrusion facing the outer lid when the outer lid is attached to the mobile terminal.

4. The waterproofing structure of a mobile terminal according to claim 2,
    wherein the outer lid includes a protrusion that transfers a biasing force applied by the outer lid to the surface of the waterproof lid, said protrusion facing the waterproof lid when the outer lid is attached to the mobile terminal.

5. A mobile terminal comprising:
    a case;
    an annular groove that surrounds an outer edge of an open portion of a cavity of the case, said annular groove forming a gap between two side wall surfaces of the groove, each of the two side wall surfaces provided immediately adjacent the gap; and a waterproof lid that covers an entirety of the open portion of the cavity and seals the cavity to form a waterproof cavity, wherein the waterproof lid is removable and includes:
a main body portion,
an inner flat portion extending substantially along a same plane as the main body portion,
an annular protrusion extending substantially perpendicular to the inner flat portion and extending into the gap formed by the annular groove and in between the two side wall surfaces, and
an elastic resin portion that covers an entirety of an outer surface of the annular protrusion and the inner flat portion, the elastic resin portion configured to be in press-contact with only one of the two side wall surfaces of the annular groove when the annular protrusion and elastic resin portion are disposed in the annular groove, wherein the two side wall surfaces of the annular groove include an inner side wall surface and an outer side wall surface, and the elastic resin portion being positioned to press-contact and adhere to the outer side wall surface and being separated from the inner side wall surface by a predetermined gap.

6. The mobile terminal according to claim 5, further comprising:
an outer lid attached to the mobile terminal and formed to cover an entire surface of the waterproof lid when the annular protrusion and fitted into the annular groove, the outer lid applying a load to a surface of the waterproof lid that faces the outer lid so as to warp the waterproof lid in such a direction that the elastic resin portion is pressed against the outer side wall surface of the annular groove.

7. The mobile terminal according to claim 6,
wherein the waterproof lid includes a protrusion that transfers a biasing force applied by the outer lid to the surface of the waterproof lid, said protrusion facing the outer lid when the outer lid is attached to the mobile terminal.

8. The mobile terminal according to claim 6,
wherein the outer lid includes a protrusion that transfers a biasing force applied by the outer lid to the surface of the waterproof lid, said protrusion facing the waterproof lid when the outer lid is attached to the mobile terminal.

9. A mobile terminal comprising:

a case;

an annular groove that surrounds an outer edge of an open portion of a cavity of the case, said annular groove forming a gap between two side wall surfaces of the groove, each of the two side wall surfaces provided immediately adjacent the gap; and a waterproof lid that when positioned to cover an entirety of the open portion of the cavity, seals the cavity to form a waterproof cavity, wherein the waterproof lid is removable and includes:
a main body portion,
an inner flat portion extending substantially along a same plane as the main body portion,
fitting means extending substantially perpendicular to the inner flat portion and extending into the gap and between the two side wall surfaces formed by the annular groove, and
sealing means for covering an entirety of an outer surface of the fitting means and the inner flat portion and for sealing the waterproof lid on the case to form the waterproof cavity while allowing air to escape said annular groove while said waterproof lid is being fit in the annular groove, wherein the two side wall surfaces of the annular groove include an inner side wall surface and an outer side wall surface, and the elastic resin portion being positioned to press-contact and adhere to the outer side wall surface and being separated from the inner side wall surface by a predetermined gap.

\* \* \* \* \*